(12) United States Patent
Springer

(10) Patent No.: US 9,944,140 B2
(45) Date of Patent: Apr. 17, 2018

(54) TOW RETRIEVAL SYSTEM FOR MINING MACHINE

(71) Applicant: Caterpillar Underground Mining Pty. Ltd., South Burnie (AU)

(72) Inventor: Steven Springer, North Aurora, IL (US)

(73) Assignee: Caterpillar Underground Mining Pty. Ltd. (AU)

( * ) Notice: Subject to any disclaimer, the term of this patent is extended or adjusted under 35 U.S.C. 154(b) by 17 days.

(21) Appl. No.: 14/966,632

(22) Filed: Dec. 11, 2015

(65) Prior Publication Data

US 2017/0166022 A1  Jun. 15, 2017

(51) Int. Cl.
| | |
|---|---|
| *B60D 1/56* | (2006.01) |
| *B60D 1/24* | (2006.01) |
| *E21F 13/00* | (2006.01) |
| *B60D 1/00* | (2006.01) |

(52) U.S. Cl.
CPC .............. *B60D 1/565* (2013.01); *B60D 1/242* (2013.01); *E21F 13/006* (2013.01); *B60D 2001/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,180,048 A | * | 11/1939 | Gurton | B62D 53/12 180/14.1 |
| 2,306,007 A | * | 12/1942 | Thorp | B60D 1/56 280/443 |
| 3,051,337 A | * | 8/1962 | Nelson | B60P 3/125 248/352 |
| 3,165,335 A | * | 1/1965 | Methven | B62D 53/125 280/421 |
| 3,545,421 A | * | 12/1970 | Strader | F01L 1/00 123/198 D |
| 5,915,714 A | | 6/1999 | Bell et al. | |
| 6,527,292 B2 | | 3/2003 | Adair | |
| 8,308,184 B2 | | 11/2012 | Seiki | |
| 8,747,022 B1 | | 6/2014 | Caterpillar | |
| 2005/0115795 A1 | * | 6/2005 | Bailey | A01C 23/008 198/300 |
| 2005/0286257 A1 | * | 12/2005 | Trimmer | B60Q 1/50 362/485 |

(Continued)

FOREIGN PATENT DOCUMENTS

EP    2404810    11/2012
WO    2014201547  12/2014

*Primary Examiner* — Kevin Hurley
(74) *Attorney, Agent, or Firm* — Miller, Matthias & Hull; Leonard Stewart

(57) ABSTRACT

A mining machine frame having a primary tow plate is disclosed, as well as a tow retrieval system for mounting to the primary tow plate of a mining machine frame. The tow retrieval system may include a brake release mounting plate configured for attachment to the primary tow plate of the mining machine frame. The tow retrieval system may also include a towing attachment also configured for attachment to the primary tow plate of the mining machine frame. The towing attachment may be further configured to receive a retrieval instrument during a towing operation.

8 Claims, 6 Drawing Sheets

(56) References Cited

U.S. PATENT DOCUMENTS

| | | | |
|---|---|---|---|
| 2006/0045707 A1* | 3/2006 | Nolasco | B60P 3/125 |
| | | | 414/563 |
| 2006/0208457 A1* | 9/2006 | Staggs | B60D 1/025 |
| | | | 280/504 |
| 2007/0080516 A1 | 4/2007 | Simmons | |
| 2009/0302574 A1* | 12/2009 | Columbia | B60D 1/06 |
| | | | 280/507 |
| 2010/0109278 A1* | 5/2010 | Treude | B60D 1/242 |
| | | | 280/137.502 |
| 2013/0140092 A1* | 6/2013 | Warr | E21B 7/02 |
| | | | 175/219 |
| 2014/0023523 A1* | 1/2014 | Berg | B60L 10/04 |
| | | | 417/53 |
| 2016/0075197 A1* | 3/2016 | Coleman | B62D 53/0864 |
| | | | 280/433 |
| 2016/0084695 A1* | 3/2016 | Funk | G01F 23/0076 |
| | | | 73/292 |
| 2016/0177538 A1* | 6/2016 | Seljestad | E02F 3/404 |
| | | | 37/406 |

* cited by examiner

TOW RETRIEVAL SYSTEM FOR MINING MACHINE

TECHNICAL FIELD

The present disclosure generally relates to a tow retrieval system for a mining machine and, more particularly, relates to a mining machine frame and towing attachments therefor.

BACKGROUND

Mining is a complex operation that requires large machines and machine operators to undertake challenging tasks in potentially dangerous environments. Typical mining machines such as continuous miners, feeder breakers, roof bolters, utility vehicles for mining, load haul dump (LHD) vehicles, underground mining loaders and underground articulated trucks are under significant stress during everyday mining operations. For example, mining machines may be subject to rock falls onto the machine or the complete collapse or cave-in of a mine wall or roof onto the machine. In the case where significant amounts rock or other material has fallen onto the machine, retrieval of the machine by towing may be required to remove the machine, and possibly the machine operator, from the work environment. Alternatively, other damage to the machine or other engine difficulties may indefinitely immobilize the machine, therefore requiring tow retrieval of the machine from the environment.

Like all disabled machines, mining machines may require preparation for towing, including disengagement of the brakes. Typically, machines include a hydraulic brake system that is spring loaded and hydraulically disengaged. Specifically, springs maintain the brakes in an engaged mode until the activation of hydraulic pressure overcomes the force of the springs and releases the brakes. In a dead engine situation, or where operation of the engine is not feasible, there is normally no hydraulic pressure available to release the brakes. This is typically desired to prevent the machine from moving when engine failure occurs, or to keep the machine from moving when the engine is turned off. However, if towing the machine is required, it may be necessary to release the brakes. Machines are therefore oftentimes adapted with brake release systems. Certain brake release systems include an independent brake circuit that is activated by the depressing of an activation piston. For example, when depressed, the activation piston charges the brake circuits with hydraulic pressure, releasing the spring applied, fluid release brakes. Thereafter, the machine may then be retrieved or towed out of the work environment. Oftentimes, due to dangerous conditions, remote control applications are utilized to recover machines in areas of unsupported ground. Alternatively, if such remote controlled applications are unavailable, an LHD machine or other mining machine may be employed for the towing of the disabled mining machine.

For retrieval purposes, mining machine frames are sometimes permanently equipped with towing devices or other means that work in combination with brake release systems, which are also permanently fixed to the machine frame. Depending on such factors as the weight and size of the machine, the particular mine and the retrieval vehicle, several mining machine frames are available. For example, a frame having a tow hook welded thereto, or otherwise permanently modified with a tow hook, may be preferred where the retrieval operation will employ a cable delivered to the tow hook via a remotely controlled apparatus. Alternatively, if the retrieval vehicle is a loader, a machine frame configuration that works in combination with a retrieval instrument mounted to the loader may be preferred. In all cases, however, the mining machine frame is permanently modified with the towing attachment or configuration prior to deployment into the mine and, therefore, the towing options are limited. As such, the number of retrieval vehicles exploitable for towing the disabled machine are also limited. Furthermore, any necessary onsite adaption of a mining machine to facilitate towing is impossible. Such limitations are undesirable from both an efficiency standpoint as well as a safety standpoint. This is especially true where a machine operator is trapped within a disabled machine and time is of the essence. Accordingly, it would be beneficial to provide a machine frame and tow retrieval system that allows for the utilization of multiple, interchangeable towing attachments, which are fitted to the machine without modifying the frame structure or having to weld attachments thereon. In this manner, the above-described inefficiencies typically associated with tow retrieval operations of mining machinery may be avoided. Additionally, such a machine frame and tow retrieval system would also provide mining machine owners and operators significant flexibility in terms of tow retrieval options.

SUMMARY

In accordance with one aspect of the present disclosure, a mining machine is disclosed which may include a machine frame having a primary tow plate, the primary tow plate configured to receive an interchangeable towing attachment. The mining machine may further include at least one traction device configured to support the machine frame, and an engine supported by the machine frame and configured to drive the at least one traction device to propel the mining machine. In addition, the mining machine may include at least one work implement supported by the machine frame.

In accordance with another aspect of the present disclosure, a tow retrieval system for a mining machine is disclosed. The tow retrieval system may include a brake release mounting plate configured for attachment to a primary tow plate of a mining machine frame. In addition, the tow retrieval system may include a towing attachment configured for attachment to the primary tow plate and adapted to receive a retrieval instrument.

In accordance with another aspect of the present disclosure, a tow hook attachment for a mining machine frame is disclosed. The tow hook attachment may include a plate having a substantially planar top surface and a plurality of holes extending through the plate from a bottom surface to the top surface. The holes may be configured to receive a plurality of rod devices for mounting the plate to a primary tow plate of a mining machine frame. Further, the disclosed tow hook attachment may include a vertically pivotable tow hook.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
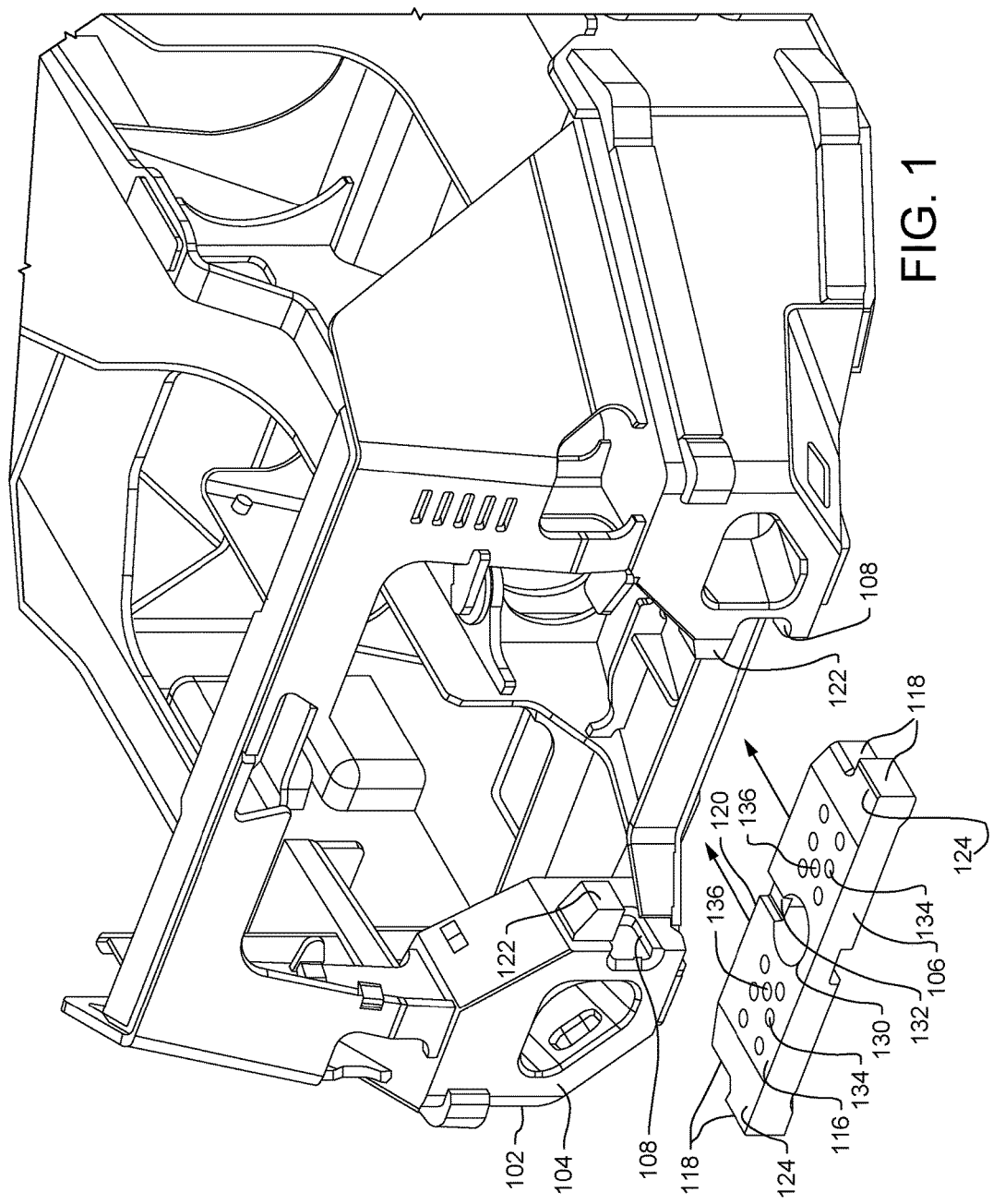
FIG. 1 is a perspective view of a primary tow plate and of a rear end of an exemplary mining machine frame.

FIG. 1 partially illustrates the rear end of a frame of an exemplary mining machine, in this case, an underground mining loader. Alternatively, the machine may be any machine that performs operations associated with an industry such as mining, construction, farming or any other industry known in the art. For example, the machine may be an earth moving machine such as a miner, a dozer, a loader, a backhoe, an excavator, a motor grader, a dump truck or any other earth moving machine. Likewise, the machine may be one of many underground mining machines, for example, a feeder breaker, a roof bolter, a utility vehicle for mining, any LHD vehicle, a scoop, an underground articulated truck or another type of heavy machinery or system used in underground mining.

Referring to FIG. 1, such machines may include a frame 102 and at least one work implement (not shown). The implement may include any work tool used for the performance of a task by the respective machine. For example, the implement may be a blade, a bucket, a shovel, a ripper, a dump bed, a propelling device or any other task-performing device known in the art. The frame 102 may be supported on one or more traction devices (not shown). The machine may further include a power source, i.e., an engine, to provide power for the machine to move about. Specifically, the engine may drive the traction device of the machine to propel the machine.

Figure 2:
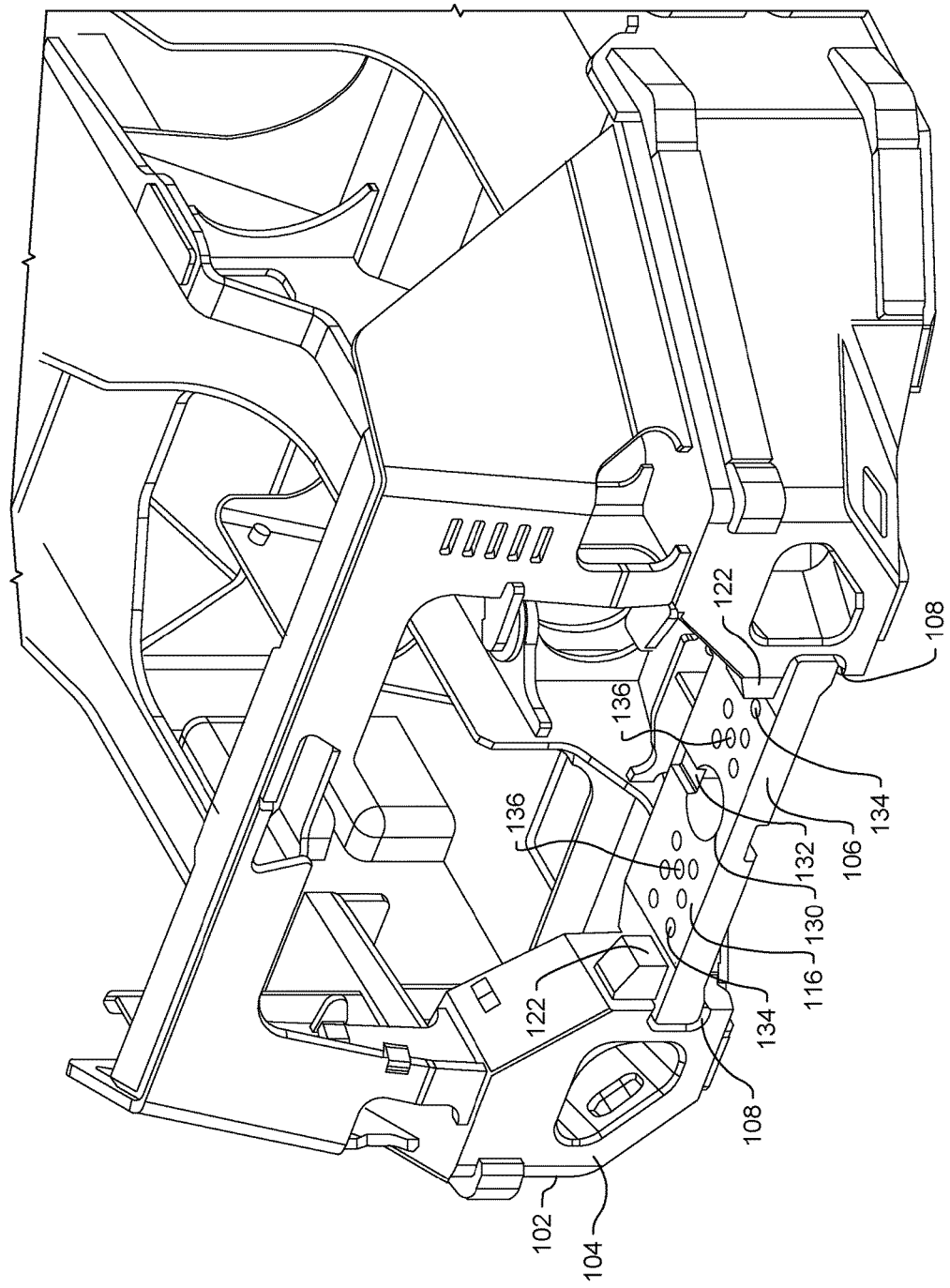
FIG. 2 is a perspective view of a rear end of an exemplary mining machine frame including the primary tow plate of FIG. 1.

Occasionally, the machine engine may malfunction or the machine may be disabled due to a rock fall or cave-in. In the event that the machine is not able to move on its own power, towing the machine may be required. In order to facilitate tow retrieval operations, a modified machine frame 102 is disclosed herein. The disclosed frame 102 is modified to enable towing of the machine and the mounting of towing attachments thereto. FIG. 1 illustrates the machine frame 102 as it may be adapted to receive a primary tow plate 106. Specifically, the rear end 104 of the machine frame 102 may include slots 108 for accommodating the primary tow plate 106. As indicated by the arrows, the primary tow plate 106 may be guided into the slots 108 of the frame 102. FIG. 2 illustrates the modified frame 102, including the primary tow plate 106. The primary tow plate 106 may become a permanent feature of the machine frame 102 once welded into place. While only the rear end 104 of the machine frame 102 is shown to include the primary tow plate 106, the machine frame 102 may be modified elsewhere, including at a front end of the machine.

The primary tow plate 106 may be a burn-to-shape steel plate having various features machined into its surface or through the plate entirely. The primary tow plate 106 may include a substantially planar top surface 116, sidewalls 118 opposing each other at opposite ends of the primary tow plate 106, and a front end 120. The sidewalls 118, as well as a front end 120 wall, may be perpendicular to the planar top surface 116 of the primary tow plate 106. Alternatively, the sidewalls 118 and front end 120 wall may be configured at an angle to one another or to the top surface 116. The sidewalls 118 may be received in the slots 108 and in the machine frame 102, and therefore, may provide welding points for welding the primary tow plate 106 to the machine frame 102, thereby permanently securing the primary tow plate 106 to the machine frame 102. Likewise, gussets 122 on the machine frame 102 provide for additional welding points between the machine frame 102 and the top surface 116 of the primary tow plate 106. The primary tow plate 106 may also be designed to include end protrusions 124 which may also be received within the slots 108 once the primary tow plate 106 is guided into the machine frame 102. Not only do the sidewalls 118 of these protrusions 124 provide for welding points between the primary tow plate 106 and the machine frame 102, but they also function to prevent the primary tow plate 106 from being inadvertently forced into the machine farther than intended. For example, should the machine accidentally back into a mine wall or otherwise collide with another obstruction along any area of the primary tow plate 106, protrusions 124 provide an additional physical stop that may prevent or hinder the forcing of the primary tow plate 106 farther into the machine or the machine frame 102, thereby damaging the machine frame 102.

The primary tow plate 106 may also include a primary opening 130 that extends between a bottom surface and the top surface 116 of the primary tow plate 106. While all shapes are contemplated herein, the primary opening 130 is illustrated as circular. The primary opening 130 may function to receive a retrieval instrument or other device, as more specifically described below. Additionally, the top surface 116 of the primary tow plate 106 may include an indentation 132 between the primary opening 130 and the front end 120, the purpose of which is to allow clearance of hydraulic lines of a brake release cylinder, as detailed further below. Finally, the primary tow plate 106 may include a plurality of holes 134, 136 there through, extending from the bottom surface to the top surface 116. The holes 134 may be configured to receive pin-type devices or other means, such as bolts, for securing attachments to the primary tow plate 106, whereas the holes 136 may be alignment holes intended to aid in the correct alignment of any such attachments with the primary tow plate 106 during the mounting process. The particular grade of steel used for fabricating the primary tow plate 106, as well as its dimensions and the number of holes 134 therein, may depend on the size and weight of the mining machine.

Figure 3:
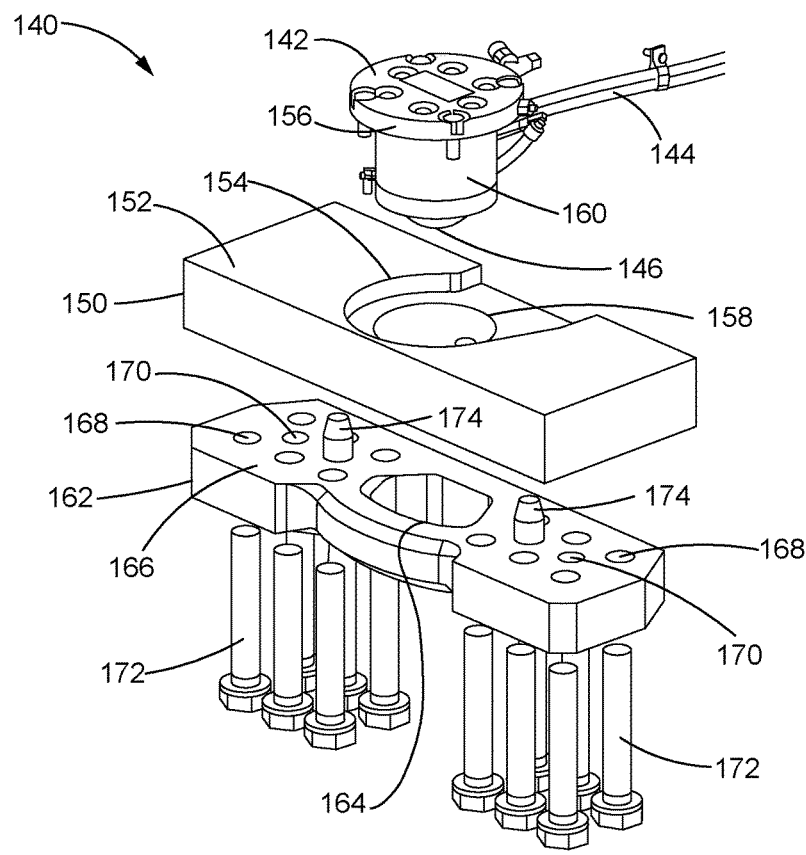
FIG. 3 is an exploded perspective view of an exemplary tow retrieval system that may be used in conjunction with the machine frame of FIG. 2.
Figure 4:
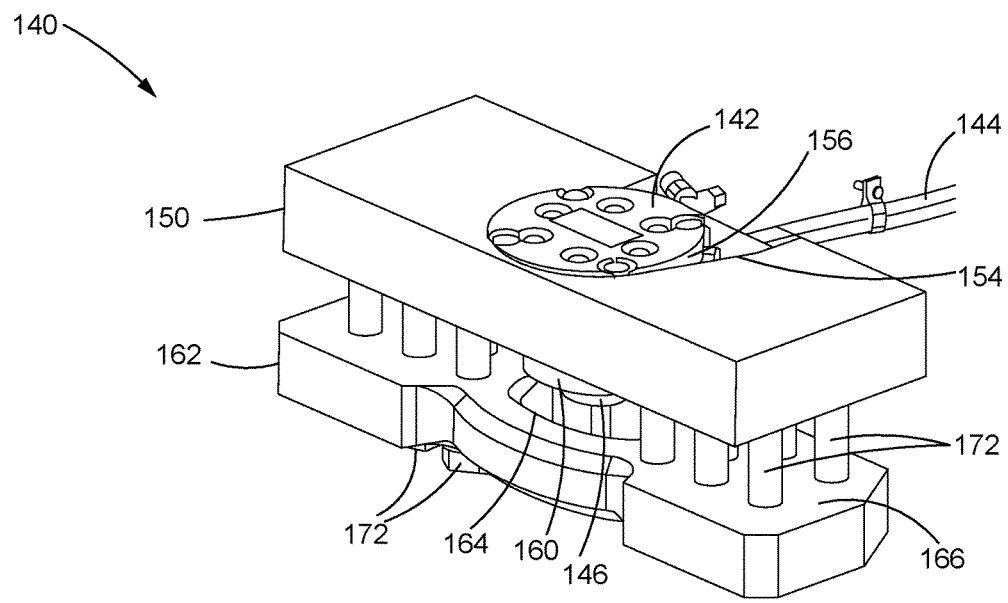
FIG. 4 is a perspective view of the assembled tow retrieval system of FIG. 3.

While the primary tow plate 106 alone may facilitate towing of a disabled machine, as described below, contemplated herein are tow retrieval systems having interchangeable towing attachments that can be mounted to the primary tow plate 106. FIGS. 3 and 4 illustrate an example of such a tow retrieval system 140, FIG. 3 being an exploded view while FIG. 4 illustrates the assembled elements. To begin with, the tow retrieval systems contemplated herein may function in combination with a brake release cylinder 142 similar to that illustrated in FIGS. 3 and 4. Brake release systems are commonly employed in work machines and therefore will not be detailed herein, except as necessary to describe the tow retrieval systems. Brake release systems may include a brake release cylinder 142, hydraulic lines 144, as well as an activation piston 146. During a tow retrieval operation, the activation piston 146 may be depressed, which in turn charges the brake circuits with hydraulic pressure, thereby releasing the spring applied, fluid release brakes. Thereafter, with the brakes released, towing of the disabled machine can proceed.

For accommodating such a brake release cylinder 142, the tow retrieval systems of the present disclosure include a brake release mounting plate 150. The mounting plate 150 may include a substantially planar top surface 152 having a cutout 154 therein, which is sized to receive an upper portion 156 of the brake release cylinder 142. Likewise, the mounting plate 150 may include an opening 158, which extends through the mounting plate 150 and is sized to receive a lower portion 160 of the brake release cylinder 142 and the activation piston 146. The tow retrieval system 140 of FIGS. 3 and 4 further includes a tow retrieval plate 162. The tow retrieval plate 162 includes a primary opening 164 that extends through the tow retrieval plate 162 from a bottom surface to a top surface 166 of the tow retrieval plate 162. In addition, like the primary tow plate 106 described above, the tow retrieval plate 162 may also include a plurality of holes 168, 170 extending through the tow retrieval plate 162. The holes 168 may receive a plurality of pin devices or bolts 172, the number of which may be dependent on the weight and size of the machine. Alternatively, the holes 170 may be service removal holes, further described below. Alignment pegs 174 may also be included on the top surface 166 of the tow retrieval plate 162. These alignment pegs 174 may ultimately be received in the alignment holes 136 of the primary tow plate 106, as also described below.

Figure 5:
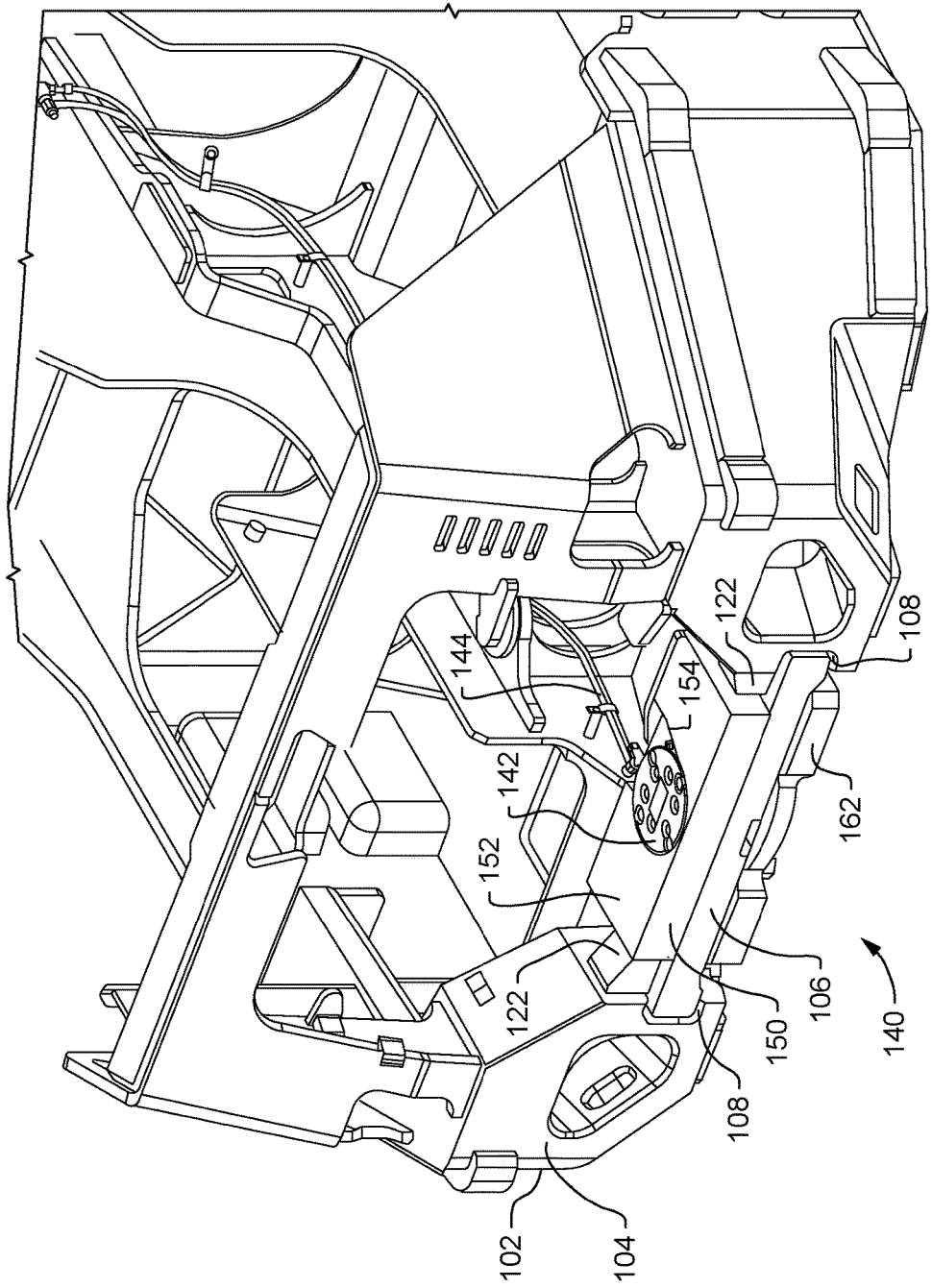
FIG. 5 is a perspective view of a rear end of an exemplary mining machine frame having the tow retrieval system of FIG. 4 mounted thereon.

As illustrated in FIGS. 3 and 4, the assembled tow retrieval system 140 may be secured together using twelve bolts 172. The bolts 172 illustrated in the present disclosure are M36 hexagon head bolts. However, rather than the illustrated bolts 172, the plates 150, 162 may be secured together with any pin devices known in the art including dowel pins, or any other means sufficient in length and strength for the present purpose. While FIG. 4 illustrates various elements of the tow retrieval system 140 assembled together, FIG. 5 illustrates the mounting of the tow retrieval system 140 onto the primary tow plate 106 of the machine frame 102. When mounted on the machine frame 102, the tow retrieval system 140 includes three vertically stacked plates 150, 106, 162, all of which are secured together with the bolts 172. Specifically, in the illustrated embodiment, the primary tow plate 106 is vertically flanked from above by the brake release mounting plate 150, and below by the tow retrieval plate 162. Mounting of the tow retrieval plate 162 onto the primary tow plate 106 is enabled by the alignment of the holes 168 of the tow retrieval plate 162 with the holes 134 of the primary tow plate 106. Specifically, when mounting the tow retrieval system 140 onto the frame 102 adapted with the primary tow plate 106, the bolts 172 are initially received in the holes 168 of the tow retrieval plate 162, pass through the holes 134 of the primary tow plate 106 and are ultimately received in holes (not shown) in a bottom surface of the brake release mounting plate 150. In this manner, the brake release mounting plate 150 may serve as a nut for the plurality of bolts 172 received therein. Alternatively, the primary tow plate 106 alone may receive the bolts 172, thereby serving as a nut for the plurality of bolts 172. Additionally, independent, loose nuts may be employed to secure the tow retrieval plate 162 to the primary tow plate 106 alone. Likewise, where the plurality of bolts 172 traverse entirely the brake release mounting plate 150, independent, loose nuts may be used to secure the tow retrieval plate 162 to the primary tow plate 106 and brake release mounting plate 150. The alignment pegs 174 disposed on the top surface 166 of the tow retrieval plate 162 may further aid in aligning the tow retrieval plate 162 correctly with the primary tow plate 106. Specifically, correct mounting of the tow retrieval plate 162 to the primary tow plate 106 occurs when the alignment pegs 174 of the tow retrieval plate 162 are received within the alignment holes 136 of the primary tow plate 106; and in this manner, the top surface 166 of the tow retrieval plate 162 may be positioned and fixed against the bottom surface of the primary tow plate 106. Likewise, the top surface 116 of the primary tow plate 106 may positioned and fixed against a bottom surface of the brake release mounting plate 150.

Furthermore, when the tow retrieval system 140 is mounted onto the primary tow plate 106 of the machine frame 102, the primary opening 130 of the primary tow plate 106 may be aligned with the primary opening 164 of the tow retrieval plate 162, as well as with the opening 158 in the brake release mounting plate 150. In this manner, the brake release cylinder 142 may be received within the tow retrieval system 140. Specifically, as described above, the upper portion 156 of the brake release cylinder 142 is received within the cutout 154 of the brake release mounting plate 150 while the lower portion 160 is received within the opening 158 of the mounting plate 150. As the lower portion 160 and the activation piston 146 of the brake release cylinder 142 may extend beyond a bottom surface of the mounting plate 150, as illustrated in FIG. 4, when mounted to the primary tow plate 106, the lower portion 160 and the activation piston 146 are received within the primary opening 130 of the primary tow plate 106. Importantly, this configuration, where the openings 130, 164, 158 are aligned, accommodate the brake release cylinder 142 and leave the activation piston 146 of the brake release cylinder 142 protected but accessible. In this manner, the brake release system may be activated either manually or using a retrieval instrument. For example, a towing operation may employ another machine having associated therewith a tool, hook or hitch-type retrieval instrument that is received within the primary opening 164 of the tow retrieval plate 162. The retrieval instrument may thereafter arrive to and depress the exposed activation piston 146 disposed within the primary opening 130 of the primary tow plate 106, as described more specifically below. While the plates 106, 162, 150 are illustrated as generally rectangular in shape, all shapes that may be accommodated by the machine frame 102 are within the scope of the present disclosure. The exact shape, dimensions and grade of steel used when fabricating the plates 150, 106, 162 may depend on the machine size and weight.

In addition, the vertical arrangement of the plates 150, 106, 162 may be reversed so long as the tow retrieval system 140 can continue to function as generally described.

Figure 6:
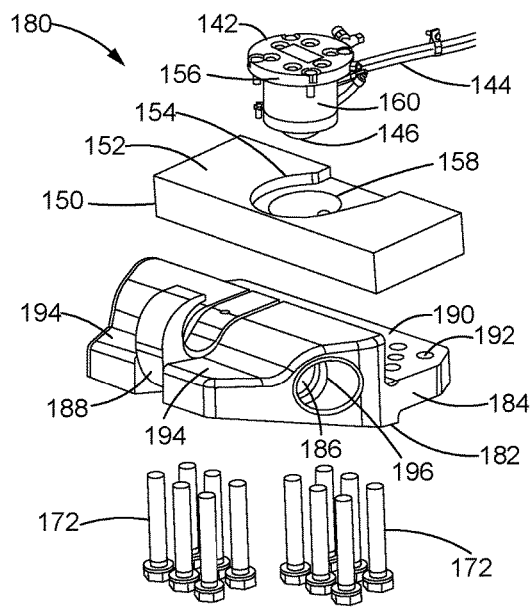
FIG. 6 is an exploded perspective view of another exemplary tow retrieval system that may be used in conjunction with the machine frame of FIG. 2.
Figure 7:
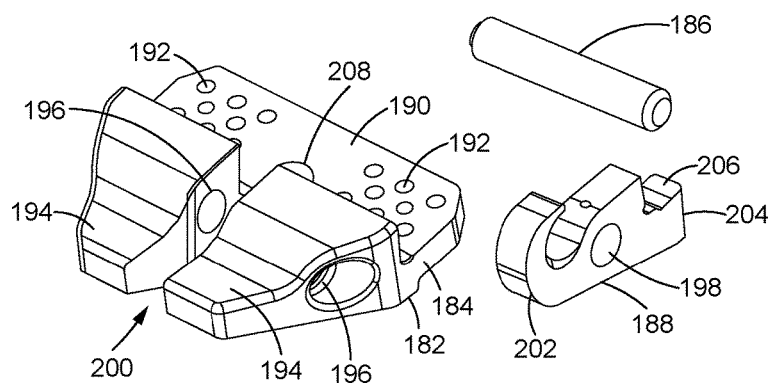
FIG. 7 is a perspective view of the unassembled tow hook attachment of FIG. 6.
Figure 8:
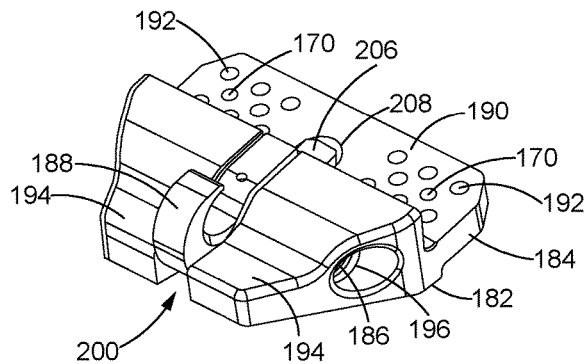
FIG. 8 is a perspective view of the assembled tow hook attachment of FIG. 6.

FIG. 6 depicts, in an exploded view, another tow retrieval system 180. Rather than having the tow retrieval plate 162 of FIGS. 3-5, the tow retrieval system 180 of FIGS. 6-9 includes a tow hook attachment 182. Many other elements of the tow retrieval system 180 are identical to those described above for the tow retrieval system 140, including the brake release mounting plate 150 for receiving a brake release cylinder 142 having an activation piston 146. Therefore, description of those elements will not be repeated here. Regarding the tow hook attachment 182, FIG. 7 illustrates possible individual, unassembled elements of the tow hook attachment 182 while FIG. 8 illustrates the assembled tow hook attachment 182 of FIG. 7. The tow hook attachment 182 may include, among other things, the three components illustrated in FIG. 7: a tow hook plate 184, a pin 186 and a hook 188. The tow hook plate 184 may include a relatively planar plate portion having a top surface 190. Similar to the tow retrieval plate 162 described above, the tow hook plate 184 may include a plurality of holes 192 there through for receiving the bolts 172. The tow hook plate 184 may also include service removal holes 170. And while not illustrated in FIGS. 7 and 8, the tow hook plate 184 may also include alignment pegs like those described above for the tow retrieval plate 162.

The tow hook plate 184 may have a body 194 extending therefrom and integral with the tow hook plate 184. Specifically, the tow hook plate 184, including the body 194, may be a single steel casting. In the assembled state, the body 194 may receive both the pin 186 and the hook 188. For example, the body 194 may include a series of openings 196 for receiving the pin 186. Likewise, the hook 188 may include an opening 198, also for receiving the pin 186. In the illustrated embodiment, the body 194 includes two sides or halves that are separated by a space 200. As illustrated, when the tow hook attachment 182 is assembled, the hook 188 is received within the space 200 between the two sides of the body 194. The hook 188 is positioned such that its opening 198 is aligned with openings 196 of the body 194. The pin 186 is also received within the body 194 at openings 196, passing from one side of the body 194, through the opening 198 of hook 188 and into the other side of the body 194. In this manner, the hook 188 is vertically pivotable relative to the tow hook plate 184 and the body 194. The pin 186 on which the hook 188 pivots may be a solid bar stock or another rod-type element known in the art that is sufficient in strength to perform the disclosed function. Further, the pin 186 may be secured inside the body 194 by way of a frictional fit, by additional opposing structure that retains the pin 186 within the body 194, or by any other means common in the art. The hook 188 may be a burn-to-shape, steel plate element. The hook 188 may also include a hook end 202 on which the hook tool is formed and a plate end 204 opposite the hook end 202. The plate end 204 of the hook 188 may include an upwardly facing surface or contact tab 206, the function of which is described below. This plate end 204 and the contact tab 206 may be received in an opening 208 in the tow hook plate 184. In this manner, sufficient space is provided for the receipt of the hook 188 and for the hook 188 to vertically pivot on the pin 186.

Figure 9:
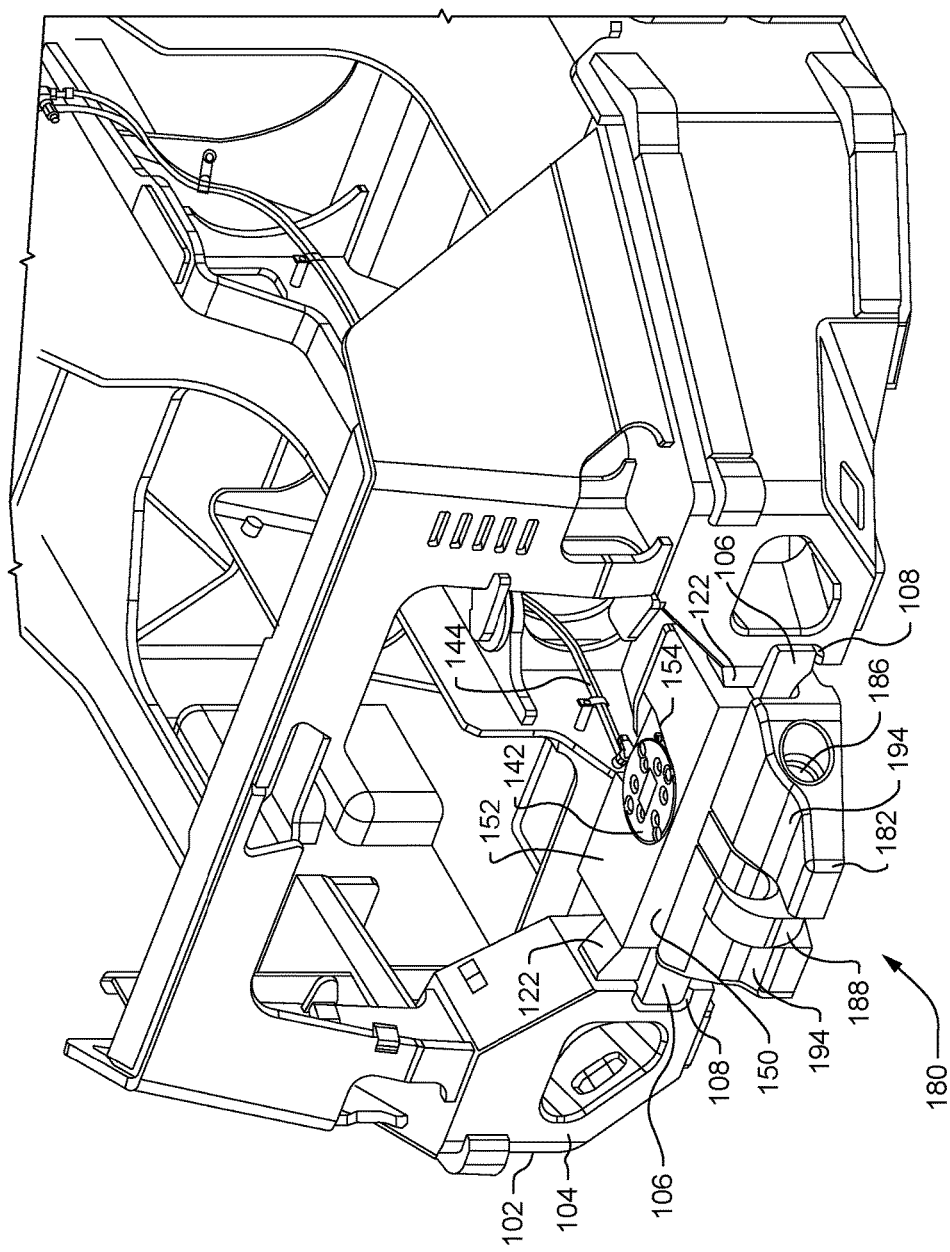
FIG. 9 is a perspective view of a rear end of an exemplary mining machine frame having the tow retrieval system of FIG. 6 mounted thereon.

FIG. 9 illustrates the tow retrieval system 180 mounted onto the primary tow plate 106 of the machine frame 102. The mounting of the tow hook attachment 182 and the brake release mounting plate 150 to the primary tow plate 106 is similar to that of the tow retrieval system 140 described above. Specifically, with reference to FIGS. 6 and 9, when mounted on the machine frame 102, the tow retrieval system 180 includes three vertically stacked plates 150, 106, 184, all of which are secured together with the bolts 172. The mounting of the tow hook plate 184 onto the primary tow plate 106 is enabled by the alignment of the holes 192 of the tow hook plate 184 with the holes 134 of the primary tow plate 106. Similar to the tow retrieval system 140, when mounting the tow retrieval system 180 onto the frame 102 adapted with the primary tow plate 106, the bolts 172 are initially received in the holes 192 of the tow hook plate 184, pass through the holes 134 of the primary tow plate 106 and are ultimately received in holes in a bottom surface of the brake release mounting plate 150. In this manner, the brake release mounting plate 150 serves as a nut for the plurality of bolts 172 received therein. Alternatively, the primary tow plate 106 alone may receive the bolts 172, thereby serving as a nut for the plurality of bolts 172. Additionally, independent, loose nuts may be employed to secure the tow hook plate 184 to the primary tow plate 106 alone. Likewise, where the plurality of bolts 172 traverse entirely the brake release mounting plate 150, independent, loose nuts may be used to secure the tow hook plate 184 to the primary tow plate 106 and brake release mounting plate 150. Alignment pegs 174 like those described above may also be employed in this embodiment to aid in mounting of the tow hook attachment 182 to the primary tow plate 106. In any case, when correctly mounted, the top surface 190 of the tow hook plate 184 is positioned and fixed against the bottom surface of the primary tow plate 106. Likewise, the top surface 116 of the primary tow plate 106 is positioned and fixed against the bottom surface of the brake release mounting plate 150.

Furthermore, when the tow retrieval system 180 is mounted onto the primary tow plate 106 of the machine frame 102, the primary opening 130 of the primary tow plate 106 is aligned with the opening 158 in the brake release mounting plate 150. In this manner, the brake release cylinder 142 may be received within the tow retrieval system 180. Specifically, as described with reference to the tow retrieval system 140, the upper portion 156 of the brake release cylinder 142 is received within the cutout 154 of the brake release mounting plate 150 while the lower portion 160 is received within the opening 158 of the brake release mounting plate 150. When assembled with the primary tow plate 106, the lower portion 160 and the activation piston 146 of the brake release cylinder 142 may extend beyond a bottom surface of the mounting plate 150, and the lower portion 160 and the activation piston 146 may be received within the primary opening 130 of the primary tow plate 106. Importantly, this configuration, where the openings 130, 158 are aligned, accommodates the brake release cylinder 142 and leaves the activation piston 146 of the brake release cylinder 142 protected but accessible. Correct mounting of the tow retrieval system 180 on the primary tow plate 106 may also align the opening 208 in the tow hook plate 184 with the primary opening 130 of the primary tow plate 106.

In the disclosed tow retrieval system 180 that utilizes the tow hook attachment 182, the body 194 and the hook 188 extend in an outward, rearward direction from the three vertically stacked plates 184, 106, 150 and the machine frame 102. As described with reference to FIGS. 7 and 8 above, the hook 188 is adapted to pivot vertically. Therefore, when the hook end 202 of the hook 188 moves in a downward direction, the plate end 204 moves in an upward direction. Such movement of the plate end 204 of the hook 188 in an upward direction may activate the brake release system. Specifically, upwardly facing contact tab 206, which is received within the opening 208 of the tow hook plate 184, may engage or depress the brake release activation piston 146 disposed in the primary opening 130 of the primary tow plate 106, thereby activating the brake release system in preparation for towing the disabled machine. In this manner, the brake release system may be activated either manually or using a retrieval instrument. For example, a towing operation of a work machine equipped with the presently described tow hook attachment 182 of the tow retrieval system 180 may utilize a cable element. Such a retrieval instrument or cable may be received on the hook 188, the pulling of which vertically pivots the plate end 204 of the hook 188 upwardly, resulting in the activation of the brake release system. While at least portions of the plates 106, 184, 150 are illustrated as generally rectangular in shape, other shapes are within the scope of the present disclosure. The exact shape, dimensions and grade of steel used when fabricating the plates 106, 184, 150 depends on the machine size and weight. Finally, various configurations of the tow hook attachment 182 are within the scope of this disclosure. For example, the tow hook attachment 182 may include more or less than the three above-described elements of FIG. 7. In addition, the exact positioning of the different tow hook attachment 182 elements may be varied. Moreover, the pivoting of the hook 188 may be accomplished in a variety of manners, all of which are within the scope of this disclosure. Finally, the vertical arrangement of the plates 150, 106, 184 may be reversed so long as the tow retrieval system 180 can continue to function as generally described.

While the above detailed description and drawings are made with reference to tow retrieval systems associated with a mining machine, it is important to note that the teachings of this disclosure can be employed in other settings where work machines are employed, such as in construction, agriculture and industrial environments.

INDUSTRIAL APPLICABILITY

In operation, the teachings of the present disclosure can be applicable to many machines including, but not limited to, earth-moving equipment, mining machines and other construction or agriculture machinery. For example, the machine frame and tow retrieval systems of the present disclosure could be used onboard continuous miners, track-type tractors, dozers, excavators, motor graders, articulated trucks, haul trucks, generator sets, etc. Examples of additional underground mining machines that may employ the disclosed tow retrieval systems include a feeder breaker, a roof bolter, a utility vehicle for mining, a load haul dump vehicle, a scoop, an underground mining loader, an underground articulated truck or another type of heavy machinery or system used in underground mining. By incorporating the machine frame 102 of the present disclosure, the machine is provided with a primary tow plate 106, which alone may facilitate the towing of the machine, should it become disabled. Further, a machine that includes a machine frame 102 permanently adapted with the disclosed primary tow plate 106 may then be fitted with various, interchangeable towing attachments without having to modify the frame structure by welding on attachments or otherwise permanently modifying the machine frame.

The towing attachment chosen for utilizing with the primary tow plate 106 may depend on the particular environment or mine, the size and weight of the machine, the retrieval vehicle available or predicted to be available for towing the machine, or machine operator preferences. In all cases, however, should an additional towing attachment be utilized in combination with the primary tow plate 106, the towing attachment may be mounted onto the primary tow plate 106 prior to the mining operation, and therefore, immediately available for exploitation when needed. Thereafter, in a different environment or mining operation, the machine frame 102 incorporating the primary tow plate 106 may be adapted with an alternative towing attachment that better suits the needs or preferences of that particular environment or operator. In all cases, the availability of an immediately accessible tow retrieval system may significantly improve the efficiency at which the disabled machine can be removed from the environment, thereby improving the overall efficiency of the operation. And in situations where workers or machine operators are in danger, such improved efficiency may be crucial.

The improved machine frame 102 and methods disclosed herein, employing the primary tow plate 106, may or may not be used in combination with an additional towing attachment. Where a machine frame 102 including the primary tow plate 106 alone is disabled, the towing operation may involve the engagement of a tow retrieval instrument with the primary opening 130 of the primary tow plate 106. For example, the tow retrieval instrument may be a tool such as hook or a hitch-type element that is inserted, from above or below, into the primary opening 130 of the primary tow plate 106. Once the hook or hitch is secured in the primary opening 130, towing of the disabled machine and removal from the environment may proceed. The tow retrieval instrument may be, for example, a tool such as a hook disposed on or in the bucket of an independent loader charged with towing the disabled machine. Alternatively, the tow retrieval instrument may be disposed on or delivered to the disabled machine by a remotely controlled machine. Remotely controlled towing operations are especially preferred where the integrity of the ground or mine is in question. The retrieval or towing machine used may employ a cable as the tow instrument for engaging with the primary opening 130 of the primary tow plate 106. Specifically, such a cable may be threaded through the primary opening 130, thereby facilitating the towing operation.

As described above, a machine frame 102 that incorporates the primary tow plate 106 may be further adapted with various, interchangeable towing attachments. One such towing attachment is the herein described tow retrieval plate 162, as illustrated in FIGS. 3-5. The tow retrieval plate 162 may be used alone or in combination with the brake release mounting plate 150, constituting the herein disclosed tow retrieval system 140. The assembled tow retrieval system 140 on the primary tow plate 106 of the machine frame 102 is illustrated in FIG. 5 and described above. During a mining operation, for example, should a machine adapted with the tow retrieval system 140 become disabled, a towing operation for removing the machine from the environment may utilize a towing instrument such as a hook or hitch, as described above. Contrary to the above-described towing operation of a machine frame that incorporates the primary tow plate 106 alone and can receive the towing instrument from above or below, the illustrated tow retrieval system 140 requires receipt of the towing instrument from below. Specifically, a retrieval instrument disposed on a bucket of a loader, for example, may be positioned at a rear end 104 of the disabled machine, and the retrieval instrument may be received into the primary opening 164 of the tow retrieval plate 162 and thereafter the primary opening 130 of the primary tow plate 106. As described above, should the tow retrieval system 140 include a brake release cylinder 142, the activation piston 146 therefor may also be disposed within the primary opening 130 of the primary tow plate 106. This configuration allows for the depressing of the activation piston 146 by the towing instrument. In this manner, the brake release system may be activated to release the brakes; and the machine, having the towing instrument secured within the primary opening 164 of the tow retrieval plate 162, may then be towed away and removed from the environment.

In certain situations, especially where a machine equipped with a towing instrument (e. g., a loader having a retrieval hook mounted onto the bucket) is not available, or is not predicted to be available in a particular work environment, the disclosed tow retrieval system 180 may be preferred. The tow retrieval system 180 employs a tow hook attachment 182 in combination with a brake release mounting plate 150; however, the tow hook attachment 182 alone may be utilized, depending on the mining machine. As described above with reference to FIGS. 6-9, the tow hook attachment 182 may include a tow hook plate 184 integrally connected with a body 194, as well as a hook 188 that is vertically pivotable on the pin 186. The assembled tow retrieval system 180, mounted onto the primary tow plate 106 of the machine frame 102 is illustrated in FIG. 9 and described above. Should a mining machine adapted with the tow retrieval system 180 become disabled, a towing operation for removing the machine from the environment may utilize a retrieval instrument such as a cable or a group of cables. In this case, the retrieval instrument or cable, which is secured at one end to an independent machine charged with towing the disabled machine out of the environment, may be deposited on or otherwise secured to the hook 188 of the tow hook attachment 182. As is described above with reference to the tow retrieval system 140, the towing machine itself or the delivery of the retrieval instrument to the disabled machine may involve remotely controlled applications. In any case, once the towing operation begins for a disabled machine adapted with the tow retrieval system 180, the hook 188 is pulled, causing the hook end 202 to pivot in a downward direction. In turn, the opposite end of the hook 188, i.e., the plate end 204, pivots in an upward direction. As also described above, should the tow retrieval system 180 include a brake release cylinder 142 received within openings 158, 130, the upwardly pivoted plate end 204 of hook 188 will force the contact tab 206 to depress the activation piston 146 of the brake release cylinder 142, thereby releasing the brakes for towing. This configuration, having the towing instrument or cable secured to the hook 188, enables the nearly simultaneous activation of the brake release system with the pulling of the hook 188, thereby allowing the disabled machine to be towed away and removed from the environment.

As described herein, where a machine having a machine frame 102 that incorporates the disclosed primary tow plate 106 is provided, a machine operator may chose between different towing attachments for mounting onto the primary tow plate 106 in order to facilitate towing. An infinite number of interchangeable towing attachments or tow configurations may be designed and used in combination with the disclosed primary tow plate 106 depending on the customer and application needs. As such, a machine frame 102 that includes the disclosed primary tow plate 106 has significant flexibility with regard to its towing options. Any towing attachment may be used in further combination with the disclosed brake release mounting plate 150 and brake release cylinder 142, or may be used alone. In that case, it may be required to release the brakes manually. Alternatively, the operator may elect to rely on the primary tow plate 106 alone, which as described above, also enables towing of a disabled machine. The towing plates or attachments 162, 182 used in combination with the brake release mounting plate 150 and the brake release cylinder 142 constitute the disclosed tow retrieval systems 140, 180.

While it is preferred that the mounting of the tow retrieval systems 140, 180 to the primary tow plate 106 take place prior to the mining operation, circumstances may require mounting of the tow retrieval systems onsite, in a mine or work environment. Likewise, depending on the exact circumstances, it may be necessary to switch out one tow retrieval system for another. The presently disclosed tow retrieval systems 140, 180 and primary tow plate 106 advantageously allow such flexibility. For example, the tow retrieval systems 140, 180 may be entirely removed from the primary tow plate 106 onsite. Alternatively, the tow retrieval plate 162 may be switched out for the tow hook attachment 182. In this case the brake release mounting plate 150 in which the brake release cylinder 142 is disposed, may or may not be changed. As the brake release mounting plate 150 of the two systems is identical or substantially similar, it is contemplated herein that switching between tow retrieval systems 140,180 advantageously only requires switching of the tow plate or towing attachment 162, 182. This is the case whether the exchange takes place prior to the operation or onsite. In all cases, the adaption of the machine frame 102 with a towing attachment, or the replacement of one towing attachment with another, advantageously does not require any additional permanent modification of the machine frame 102 or welding of attachments thereto.

Finally, with regard to the removal of the tow retrieval systems 140, 180 from the primary tow plate 106, for exchanging with an alternate system or otherwise, the service removal holes 170 may prove useful. Specifically, as illustrated in FIG. 3, the tow retrieval plate 162 includes service removal holes 170. Likewise, as illustrated in FIG. 7, the tow hook attachment 182 includes service removal holes 170. Any towing attachment or plate, as well as the primary tow plate 106, may include the same. In certain cases, especially after extended use, the brake release mounting plate 150 or the tow retrieval plate 162 may become substantially fixed to the primary tow plate 106, even after removal of the bolts 172. To aid in removing the brake release mounting plate 150, the tow retrieval plate 162 or the tow hook attachment 182 from the primary tow plate 106, the service removal holes 170 are provided. The holes 136 of the primary tow plate 106 may or may not align with the holes 170. In all cases however, the holes are provided so that work personnel may insert a tool or tools therein for prying or knocking the plates or attachments 162, 182, 150 loose from the primary tow plate 106. In this manner, the efficiency of the adaption of the machine frame 102 with alternate towing attachments or removal of the same is again improved.

All references to the disclosure or examples thereof are intended to reference the particular example being discussed at that point and are not intended to imply any limitation as to the scope of the disclosure more generally. Additionally, those skilled in the art will appreciate that various modifications might be made to the presently disclosed embodiments without departing from the full and fair scope of the present disclosure.

What is claimed is:

1. A mining machine, comprising:
 a machine frame having a primary tow plate, the primary tow plate configured to receive an interchangeable towing attachment;
 the primary tow plate is also configured to receive a brake release mounting plate, wherein the primary tow plate includes a plurality of holes and a primary opening extending through the primary tow plate, wherein the plurality of holes are configured to receive a plurality of rod devices for securing the brake release mounting plate and the towing attachment to the primary tow plate;
 at least one traction device configured to support the machine frame;
 an engine supported by the machine frame and configured to drive the at least one traction device to propel the mining machine; and
 at least one work implement supported by the machine frame.

2. The mining machine of claim 1, wherein the interchangeable towing attachment is a tow retrieval plate.

3. The mining machine of claim 1, wherein the interchangeable towing attachment is a tow hook attachment.

4. The mining machine of claim 1, wherein the primary tow plate is permanently welded to the machine frame.

5. A tow retrieval system for a mining machine, comprising:
 a brake release mounting plate configured for attachment to a primary tow plate of a mining machine frame;
 a towing attachment configured for attachment to the primary tow plate and adapted to receive a tow retrieval instrument;
 the brake release mounting plate is configured for attachment above the primary tow plate and the towing attachment is configured for attachment below the primary tow plate, wherein the brake release mounting plate includes an opening that is substantially aligned with a primary opening in the primary tow plate, and wherein the brake release mounting plate and the primary tow plate are configured to receive a brake release cylinder;
 the towing attachment includes a primary opening that is substantially aligned with the primary opening of the primary tow plate; and
 the tow retrieval instrument is a tool mounted to a retrieval vehicle.

6. The tow retrieval system of claim 5, wherein the towing attachment is a tow retrieval plate.

7. The tow retrieval system of claim 5, wherein the towing attachment is a tow hook attachment.

8. The tow retrieval system of claim 5, further comprising a plurality of rod devices for mounting the brake release mounting plate and the towing attachment to the primary tow plate.

* * * * *